Patented July 25, 1950

2,516,299

UNITED STATES PATENT OFFICE 2,516,299

METHOD OF DETOXIFYING AND STABILIZING CASTOR BEANS

Bernard Chiego, Newark, N. J., assignor of one-half to Clark-Babbitt Industries, Inc., Boston, Mass., a corporation of Delaware No Drawing. Application July 28, 1947, Serial No. 764,261

3 Claims. (Cl. 260—412.2)

This invention relates to a method of processing castor beans in such a manner as to obtain new and improved results or benefits therefrom which, so far as I am aware, have not been obtainable heretofore.

The advantages or benefits derived from my process are as follows:

1. Complete decortication.
2. Destruction of the toxalbumin ricin the only poisonous substance in the castor bean.
3. The dehusked beans are rendered more readily extractable by reason of a slightly expanded structure.
4. The oil from said beans is non-toxic and non-laxative.
5. The oil from said beans is more stable to oxidation.
6. The residue from the extraction of the castor bean meat (castor pomace) is not only non-toxic but edible and nutritious.
7. The shells of the bean after decortication are left in a state so they can be put to a useful purpose as will be later pointed out.

In order to obtain these advantages I have found that the castor beans must be treated in a special manner as will be described.

I have found after much study and many tests that, by treating the castor beans in a pressure vessel or chamber with superheated steam at a superatmospheric pressure over a time interval, which I have discovered should be very short, when the superheated steam is shut off and the pressure quickly reduced, the hulls are exploded, thereby freeing the bean meat without injury thereto.

By my process when a suitable quantity of whole raw castor beans are placed into a suitable pressure chamber equipped with means for passing superheated steam thereinto—with means for quickly reducing the pressure after an interval of time, the internal pressure set up within the bean shell itself, the shell will explode from off the meat of the bean, thereby leaving a clean separation of the hull and the castor bean meat. The pressure may be varied with the temperature and time.

For example, by way of illustration, but not of limitation, when a pressure of 150 pounds is used at a temperature of 800 degrees F. a time interval from 60 to 90 seconds is required to produce the required action. When the pressure is increased at 300 pounds, at a steam temperature of 1200 degrees F, a time interval of 20 seconds may be used.

This treatment destroys the oxidative enzymes normally present in the bean, denatures the toxalbumin ricin the only poisonous substance in the castor bean and slightly expands the structure of the castor bean meat yielding the benefits and advantages heretofore pointed out. Furthermore, the shells of the beans when treated in the manner described are left in a hard natural state and then can be ground and used as a filler for floor or street surfaces, its abrasiveness will tend to make non-skid surfaces.

The pressure chamber of the vessel may be equipped with a plurality of quick opening valves arranged so they may be quickly actuated in unison or some other equivalent means may be used for reducing the pressure. Since the mechanical arrangements of the pressure vessel may be varied to a considerable extent, and forms no part of my present invention, further description of and illustration of the same does not seem to be necessary.

My improved process or method of treating the castor beans at much higher pressures and temperatures than heretofore utilized, enables me to reduce the treatment time to a mere matter of seconds and thereby obtain quickly and cheaply the advantages or benefits heretofore set forth, as I have found that when ordinary live steam is used the time interval must be relatively long with the result that the oil of the bean is hydrolized and the bean meat left soggy and in bad condition.

Having thus described my invention, what I claim is:

1. The method of treating hard shelled castor beans which consists in treating them, in a pressure vessel having means for quickly reducing any pressure therein to atmospheric pressure, with steam at pressures from about 150 to about 300 lbs. and at temperatures of about 800 to 1200 degrees F. for periods of time varying from about 90 to 20 seconds respectively thereby substantially destroying the oxidative enzymes and denaturing the toxalbumin ricin, and thus destroying the only poisonous substance in the raw castor beans, then dropping the pressure abruptly to atmospheric pressure whereby the internal pressure set up within the bean shells will explode the husks or shells off the meat of the beans leaving both the meat and shells in condition for useful purposes.

2. The method of treating castor beans as set forth in claim 1 further defined in that the bean meats are then separated from the shells, then recovering the shells in a hard natural state and grinding the shells to produce an abrasive surface filling material.

3. The method of treating castor beans as set forth in claim 1 further defined in that the bean meats are then separated from the shells, then extracting an oil therefrom which is non-toxic, non-laxative and stable to oxidation.

BERNARD CHIEGO.

REFERENCES CITED

The following references are of record in the file of this patent:

UNITED STATES PATENTS

| Number | Name | Date |
| --- | --- | --- |
| 57,838 | Adams | Sept. 11, 1866 |
| 2,278,941 | Musher | Apr. 7, 1942 |
| 2,318,265 | Stagmeier | May 4, 1943 |
| 2,429,785 | Winters | Oct. 28, 1947 |